(12) United States Patent
Oishi et al.

(10) Patent No.: US 7,811,108 B2
(45) Date of Patent: Oct. 12, 2010

(54) ROTARY CONNECTOR DEVICE

(75) Inventors: Hiroshi Oishi, Tokyo (JP); Tomohiro Sato, Tokyo (JP)

(73) Assignee: Niles Co., Ltd., Tokyo (JP)

( * ) Notice: Subject to any disclaimer, the term of this patent is extended or adjusted under 35 U.S.C. 154(b) by 0 days.

(21) Appl. No.: 12/457,626

(22) Filed: Jun. 17, 2009

(65) Prior Publication Data

US 2009/0317984 A1 Dec. 24, 2009

(30) Foreign Application Priority Data

Jun. 19, 2008 (JP) .............................. 2008-160648

(51) Int. Cl.
*H01R 3/00* (2006.01)
(52) U.S. Cl. ........................................ 439/164; 439/15
(58) Field of Classification Search ................. 439/164, 439/15
See application file for complete search history.

(56) References Cited

U.S. PATENT DOCUMENTS

| | | | | |
|---|---|---|---|---|
| 5,865,634 A * | 2/1999 | Best ............................ | 439/164 |
| 5,980,286 A * | 11/1999 | Best et al. ..................... | 439/164 |
| 6,004,149 A * | 12/1999 | Ishikawa et al. ............. | 439/164 |
| 6,039,588 A * | 3/2000 | Osawa ......................... | 439/164 |
| 6,095,836 A * | 8/2000 | Bolen et al. .................. | 439/164 |
| 6,213,797 B1 * | 4/2001 | Best et al. .................... | 439/164 |
| 6,302,716 B1 * | 10/2001 | Matsumoto et al. .......... | 439/164 |
| 6,354,854 B1 * | 3/2002 | Matsuzaki ................... | 439/164 |
| 6,471,529 B2 * | 10/2002 | Oishi ........................... | 439/164 |
| 6,579,103 B2 * | 6/2003 | Araki ........................... | 439/15 |
| 6,641,404 B2 * | 11/2003 | Matsuzaki et al. ............ | 439/164 |
| 6,764,326 B2 * | 7/2004 | Matsumoto et al. .......... | 439/164 |
| 6,780,032 B2 * | 8/2004 | Rhein et al. .................. | 439/164 |
| 6,796,801 B2 * | 9/2004 | Hayashi ....................... | 439/15 |
| 6,840,787 B2 * | 1/2005 | Adachi et al. ................ | 439/164 |
| 7,175,453 B2 * | 2/2007 | Yajima et al. ................ | 439/164 |
| 7,175,454 B2 * | 2/2007 | Araki et al. .................. | 439/164 |
| 2001/0036760 A1 * | 11/2001 | Oishi ........................... | 439/164 |
| 2002/0115312 A1 * | 8/2002 | Matsuzaki et al. ............ | 439/15 |

(Continued)

FOREIGN PATENT DOCUMENTS

JP 06-338372 12/1994

*Primary Examiner*—Ross N Gushi
(74) *Attorney, Agent, or Firm*—Rader, Fishman & Grauer PLLC

(57) ABSTRACT

There are provided a body, a rotor, a free motion spacer including a group of spacer sections arranged circularly between the body and the rotor and a reverse guide section in which a guide face is provided to be opposed to a roller in the group of spacer sections in the circumferential direction to form a reverse insert section and capable of turning with rotation of the rotor, and a flat cable which is reversed by inserting the reverse section into the reverse insert section in the free motion spacer and is wound around the outer and inner peripheral sides of the group of spacer sections where ribs 45 and 47 project from a wall face at the opposing side of a guide face toward the roller adjacent to the wall face in the circumferential direction of the reverse guide section, and a projection 49 for the stopper is provided in the rib, whereby when the reverse section of the flat cable is erroneously assembled between the wall face and the roller adjacent to the wall face, the reverse section runs on the rib and the projection can restrict the reverse section to fall down from the rib.

2 Claims, 5 Drawing Sheets

U.S. PATENT DOCUMENTS

| | | | |
|---|---|---|---|
| 2003/0129867 A1* | 7/2003 | Adachi et al. | 439/164 |
| 2004/0067670 A1* | 4/2004 | Rhein et al. | 439/164 |
| 2006/0057863 A1* | 3/2006 | Araki et al. | 439/15 |
| 2006/0089035 A1* | 4/2006 | Araki et al. | 439/164 |
| 2008/0014776 A1* | 1/2008 | Asakura | 439/164 |
| 2008/0057741 A1* | 3/2008 | Inotsuka | 439/15 |
| 2008/0268661 A1* | 10/2008 | Mitsui | 439/15 |
| 2009/0011626 A1* | 1/2009 | Mitsui | 439/164 |
| 2009/0156034 A1* | 6/2009 | Araki et al. | 439/164 |
| 2009/0176393 A1* | 7/2009 | Asakura et al. | 439/164 |
| 2009/0203232 A1* | 8/2009 | Ida et al. | 439/15 |
| 2009/0317984 A1* | 12/2009 | Oishi et al. | 439/34 |
| 2009/0317994 A1* | 12/2009 | Oishi | 439/164 |
| 2009/0317995 A1* | 12/2009 | Oishi et al. | 439/164 |

* cited by examiner

ROTARY CONNECTOR DEVICE

CROSS-REFERENCE TO RELATED APPLICATION

This application claims priority under 35 USC 119 from Japanese Patent Application No. 2008-160648, the disclosure of which is incorporated by reference herein.

BACKGROUND OF THE INVENTION

1. Field of the Invention

The present invention relates to a rotary connector device supplied for electrical connection between a vehicle body and a steering wheel in an automobile.

2. Description of Related Art

In the conventional rotary connector device, a flexible cable is assembled in a member except for a specific reverse insert section and the erroneous assembly in a state where the flexible cable is attached in the wrong position possibly goes to the next process.

For preventing such an erroneous assembly, as shown in FIG. 3 in Japanese Patent Laid-Open No. 06-338372, a rotary connector device is configured in such a manner that ribs are provided in a member except for the reverse insert section, and a flexible cable runs on the rib at erroneous assembly time, thus determining the erroneous assembly of the flexible cable.

However, since in this structure, the ribs except for the reverse insert section are circularly formed on a rotary plate for restricting a height of the device in an axial direction and a group of rollers is arranged on the rib, the group of the rollers is required to shorten an axis length thereof by an amount corresponding to a height of the rib as compared to the roller forming the reverse insert section.

Therefore, an area in which the roller contacts the flexible cable is reduced to be small, thereby increasing a surface pressure which the flexible cable receives from the roller. In consequence, durability of the flexible cable may be damaged.

In an embodiment shown in FIG. 6 in Japanese Patent Laid-Open No. 06-338372, ribs are provided for preventing an erroneous assembly of the flexible cable. However, the flexible cable which has run on the ribs possibly slides into and falls down between the ribs. When the flexible cable falls down between the rib having no projection at the base section and the roller, it possibly brings the erroneous assembly.

That is, the problem to be solved by the present invention is as described below. When ribs are provided for preventing an erroneous assembly of a flexible cable, an area in which rollers contact the flexible cable is reduced to be small, thereby increasing a surface pressure which the flexible cable receives from the roller. In consequence, durability of the flexible cable may be damaged. In addition, the flexible cable which has run on the ribs provided for preventing the erroneous assembly slides on the ribs and falls down between the ribs, possibly bringing the erroneous assembly.

In view of the above, there exists a need for a rotary connector device which overcomes the above mentioned problems in the conventional art. The present invention addresses this need in the conventional art as well as other needs, which will become apparent to those skilled in the art from this disclosure.

SUMMARY OF THE INVENTION

The present invention is made in view of the foregoing problem and the present invention has an object of providing a rotary connector device which can reduce a possibility of damaging durability of a flexible cable and prevent an erroneous assembly of the flexible cable caused by an event that the flexible cable slides on ribs and falls down between the ribs.

A rotary connector device according to an aspect of the present invention comprises a fixed-side member which is supported to a vehicle body side and through which a steering shaft penetrates, a rotary-side member which is rotatably connected to the fixed side member and through which the steering shaft penetrates, and rotatable in response to rotation of a steering wheel, a free motion spacer including a group of spacer sections arranged circularly between the fixed-side member and the rotary-side member and a reverse guide section in which a guide face is provided to be opposed to any one of the spacer sections in the circumferential direction to form a reverse insert section and capable of turning with rotation of the rotary-side member, and a flexible cable which is reversed by inserting a reverse section into the reverse insert section of the free motion spacer and is wound around outer and inner peripheral sides of the group of spacer sections, the rotary connector device further comprising an interposing section provided in a wall face of the reverse guide section in the opposing side of the guide face in the circumferential direction of the reverse guide section to be positioned between the wall face and the spacer section adjacent to the wall face, and a projection for a stopper projected in the interposing section to project from the interposing section toward the direction of a rotational axis of the free motion spacer, wherein when the reverse section of the flexible cable is erroneously assembled between the wall face and the spacer section adjacent to the wall section, the reverse section runs on the interposing section and the projection restricts the reverse section to fall down from the interposing section.

ADVANTAGE OF THE INVENTION

A rotary connector device according to an aspect of the present invention comprises a fixed-side member which is supported to a vehicle body side and through which a steering shaft penetrates, a rotary-side member which is rotatably connected to the fixed side member and through which the steering shaft penetrates, and rotatable in response to rotation of a steering wheel, a free motion spacer including a group of spacer sections arranged circularly between the fixed-side member and the rotary-side member and a reverse guide section in which a guide face is provided to be opposed to any one of the spacer sections in the group of spacer sections in the circumferential direction to form a reverse insert section and capable of turning with rotation of the rotary-side member, and a flexible cable which is reversed by inserting a reverse section into the reverse insert section of the free motion spacer and is wound around outer and inner peripheral sides of the group of spacer sections, the rotary connector device further comprising an interposing section provided in a wall face of the reverse guide section in the opposing side of the guide face in the circumferential direction of the reverse guide section to be positioned between the wall face and the space section adjacent to the wall face, a projection for a stopper provided at the interposing section to project toward the direction of a rotational axis of the free motion spacer, whereby when the reverse section of the flexible cable is erroneously assembled between the wall face and the spacer section adjacent to the wall face, the reverse section runs on the interposing section and the projection can restrict the reverse section to fall down from the interposing section.

Therefore, when the free motion spacer is combined to a casing at the time the erroneous assembly is generated, a floating gap is generated between the free motion spacer and the casing by the flexible cable which has run on the interposing section, making it possible to easily find the erroneous assembly of the flexible cable. Therefore, the interposing section and the projection can restrict the erroneous assembly of the flexible cable.

Further, since the interposing section is positioned between the wall face in the reverse guide section at the opposing side of the guide face and the spacer section, the axis length of each spacer section is not influenced. Therefore, it is possible to restrict or prevent an increase of a surface pressure which the flexible cable receives from the spacer section due to maintaining the axis length of each spacer section.

In addition, the projection provided at the interposing section can prevent the erroneous assembly to be caused by the sliding of the flexible cable on the interposing section and the falling-down of the flexible cable.

An object of the present invention of restricting or preventing an increase of a surface pressure which a flexible cable receives from a spacer section while preventing an erroneous assembly by an interposing section is realized by the interposing section provided at a wall face of a reverse guide section in the opposing side of a guide face in the reverse guide section and a projection provided in the interposing section.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE EXAMPLE EMBODIMENTS

Hereinafter, a rotary connector device according to embodiments of the present invention will be explained with reference to the accompanying drawings.

First Embodiment

[Rotary Connector Device]

Figure 1:
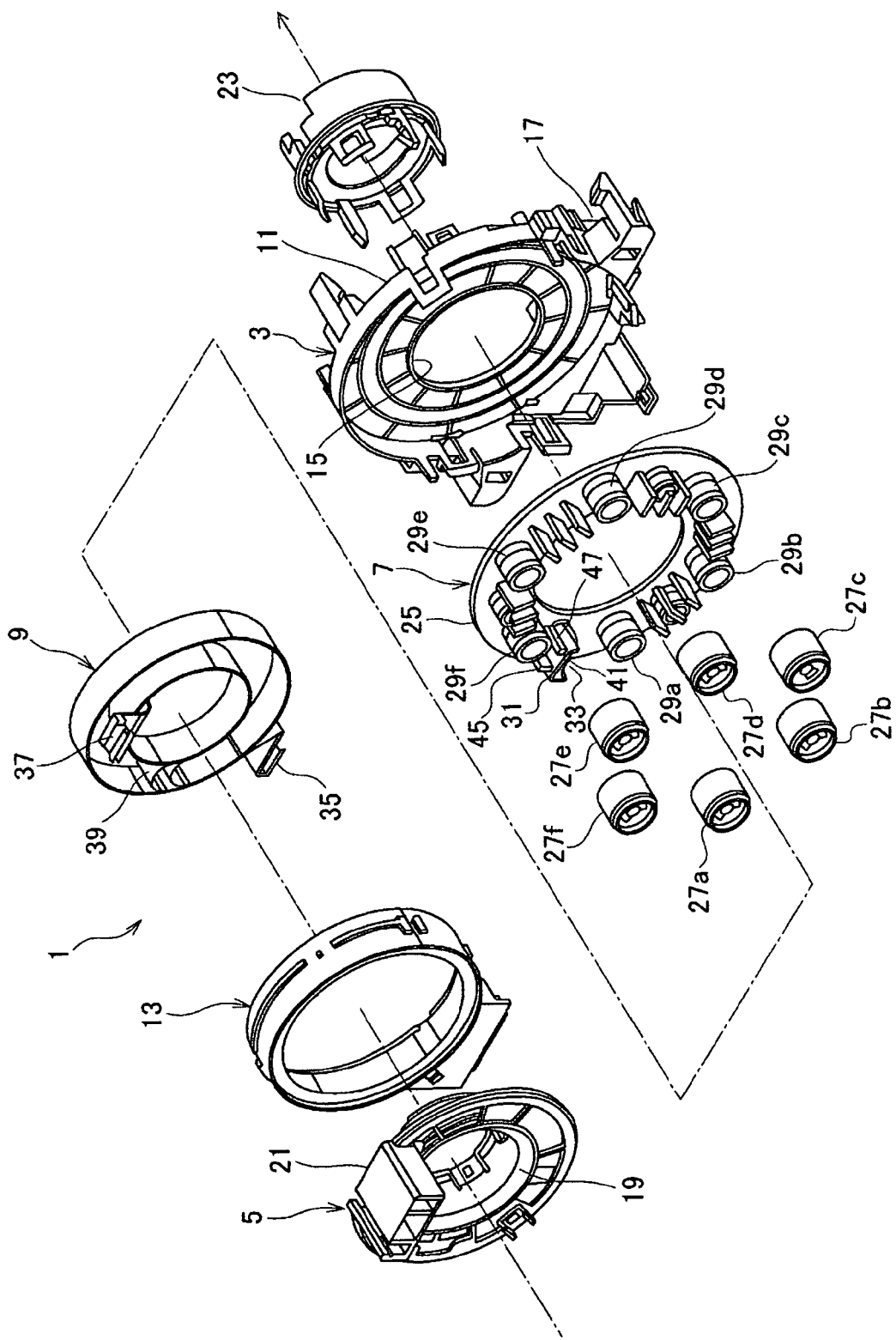
FIG. 1 is an entire exploded perspective view showing an outline of a rotary connector device according to a first embodiment of the present invention.

FIG. 1 is an entire exploded perspective view showing a rotary connector device according to a first embodiment of the present invention.

The rotary connector device 1 in FIG. 1 serves to electrically connect a horn, an air bag and the like located in the side of a steering wheel in an automobile to the side of a vehicle body. The rotary connector device 1 is provided with a body 3 as a fixed-side member, a rotor (spacer section) 5 as a rotary-side member, a free motion spacer 7, and a flat cable 9 as a flexible cable.

The body 3 is provided with a bottom cover 11 and a casing 13 engaged with the bottom cover 11. The bottom cover 11 is fixed to the side of a combination switch fixed to a steering column (not shown).

The bottom cover 11 is formed in a donut shape with resin or the like, and is provided with a fixed-side hole section 15 formed at the central portion through which a steering shaft penetrates and a fixed-side terminal support section 17 formed at the side section. A fixed-side terminal is supported to the fixed-side terminal support section 17 which constitutes a fixed-side connector section (not shown).

The rotor 5 is arranged at a bottom side of the steering wheel and is rotatable in response to rotation of the steering wheel. The rotor 5 is formed in a donut shape with resin or the like, and is provided with a rotary-side hole section 19 formed at the central portion through which the steering shaft penetrates and a rotary-side terminal support section 21 formed at the side section. A rotary-side terminal is supported to the rotary-side terminal support section 21 which constitutes a rotary-side connector section (not shown).

The rotor 5 is rotatably connected through an attachment 213 to the bottom cover 11 of the body 3.

The free motion spacer 7 is capable of turning in response to rotation of the rotor 5 and is made of resin. The free motion spacer 7 is provided with a donut-shaped plate section 25 and a plurality of rollers constituting a group of spacer sections, for example, six rollers 27a, 27b, 27c, 27d, 27e, and 27f.

Six roller support sections 29a, 29b, 29c, 29d, 29e, and 29f and one reverse guide section 31 are formed in the donut-shaped plate section 25. The rollers 27a, 27b, 27c, 27d, 27e, and 27f are rotatably supported by the respective roller support sections 29a, 29b, 29c, 29d, 29e, and 29f, and are circularly arranged between the body 3 and the rotor 5. A reverse insert section 33 is formed between one roller 27a among the rollers and the reverse guide section 31.

The flat cable 9 is provided with a fixed-side terminal 35, a rotary-side terminal 37, and a reverse section 39. The fixed-side terminal 35 is supported in the fixed-side connector section in the fixed-side terminal support section 17. The rotary-side terminal 37 is supported in the rotary-side connector section in the rotary-side terminal support section 21. The reverse section 39 changes its position with rotation of the rotor 5 sequentially.

In the flat cable 9, the fixed-side terminal 35 is supported in the side of fixed-side terminal support section 17 and the reverse section 39 is inserted into a reverse insert section 33 in the free motion spacer 7 in the casing 13. The flat cable 9 extends from the outer peripheral side to the inner peripheral side of the respective rollers 27a, 27b, 27c, 27d, 27e, and 27f through the reverse insert section 33, and the rotary-side terminal 37 is supported in the rotary-side terminal support section 21 at the side of the rotor 5.

In this way, the flat cable 9 is wound around the outer and inner peripheral sides of the respective rollers 27a, 27b, 27c, 27d, 27e, and 27f.

Figure 2:
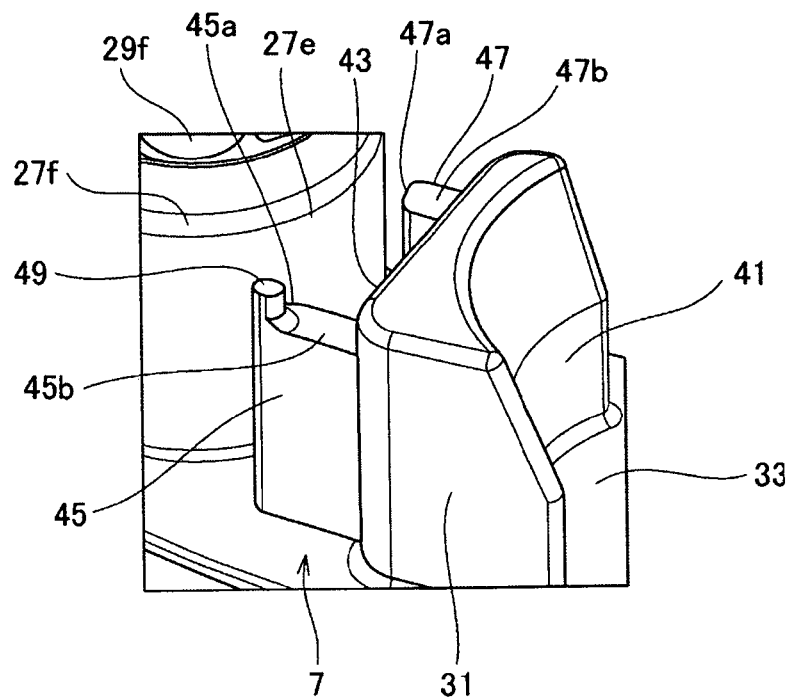
FIG. 2 is a partial enlarged perspective view showing a reverse guide section and the circumference according to the first embodiment of the present invention.
Figure 3:
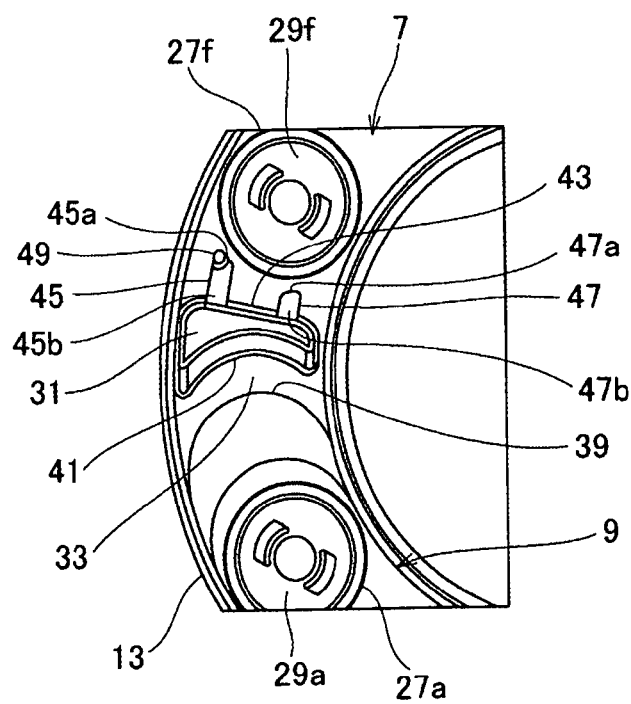
FIG. 3 is a partial enlarged plan view showing the reverse guide section and the circumference according to the first embodiment of the present invention.

FIG. 2 is a partial enlarged perspective view showing a reverse guide section and the circumference, and FIG. 3 is a partial enlarged plan view showing the reverse guide section and the circumference.

As shown in FIGS. 1 to 3, the reverse guide section 31 has a guide face 41 opposing the roller 27a in the circumferential direction of the free motion spacer 7. The guide face 41 is formed in a curvature face corresponding to the curvature of the reverse section 39 in the flat cable 9.

A wall face 43 of the reverse guide section 31 at the opposing side of the guide face 41 is formed substantially perpendicular to the donut-shaped plate section 25, and ribs 45 and 47 as a pair of interposing sections are provided at the wall face 43 to project from the wall face 43 toward the roller 27f in the circumferential direction of the free motion spacer 7. The ribs 45 and 47 are provided to be opposed with each other at the inner diameter side and at the outer diameter side in the diameter direction of the wall face 43 and are arranged within the diameter of the roller 27f not to contact the flat cable 9 wound around the group of the rollers 27a, 27b, 27c, 27d, 27e, and 27f. Each of front ends 45a and 47a in the ribs 45 and 47 is formed obliquely to correspond to an outer periphery of the roller 27f so that a clearance between the front end 45 or 47 and the roller 27f is as small as possible. The rib 45 at the side of the outer diameter of the free motion spacer 7 projects longer toward the roller 27f than the rib 47 at the side of the inner diameter of the free motion spacer 7 so that clearances between each of the front ends 45a and 47a and the rib 27f are substantially equal with each other.

Each of top side sections 45b and 47b in the ribs 45 and 47 has the equal height and is formed in a flat face to easily receive an edge section of the flat cable 9. At least one of the pair of the ribs 45 and 47, that is, the rib 45 at the side of the outer diameter of the free motion spacer 7 in the present embodiment is provided with a projection 49 for a stopper projecting in the direction of the rotational axis of the free motion spacer 7. The projection 49 is configured to project in a columnar shape at the front side of the top side section 45b and project toward the front end side of the reverse guide section 31.

Therefore, when the reverse section 39 of the flat cable 9 is in error assembled between the wall face 43 and the roller 47f adjacent to the wall face 43, the reverse section 39 runs on the ribs 45 and 47 and also the projection 49 restricts the reverse section 39 to fall down from the ribs 45 and 47.

Figure 4:
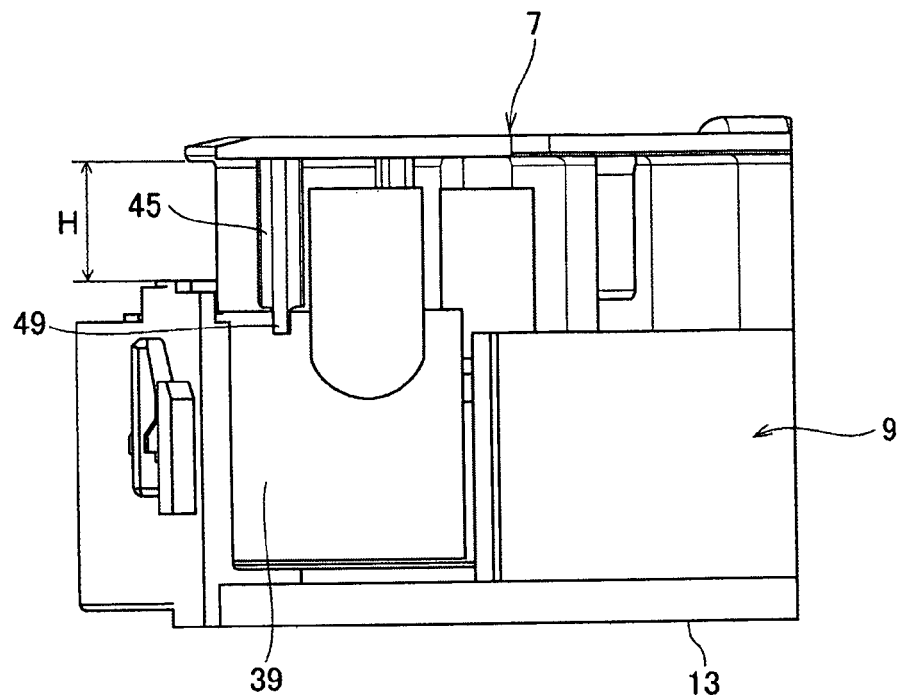
FIG. 4 is a partial enlarged side view showing an erroneous assembly state according to the first embodiment of the present invention.

FIG. 4 is a partial enlarged side view showing the erroneous assembly.

The flat cable 39, exactly speaking, the reverse section 39 thereof is inserted into the reverse insert section 33 of the free motion spacer 7 to be wound around the outer and inner peripheries of the rollers 27a, 27b, 27c, 27d, 27e, and 27f. In this state, when the free motion spacer 7 is combined to the side of the casing 13, no floating gap between the free motion spacer 7 and the casing 13 is generated, so that the casing 13 can be rotatably connected through an attachment 23 to the bottom cover 11 of the body 3 correctly.

On the other hand, when the reverse section 39 of the flat cable 9 goes over the reverse guide section 31 to be in error assembled between the roller 27f and the reverse guide section 31, the flat cable 9 runs on the top side sections 45b and 47b of the ribs 45 and 47. At this time of the running-on, in a case where the reverse section 39 slides on the top side sections 45b and 47b and moves to the front end side of the ribs 45 and 47, the reverse section 39 is engaged to the projection 49 of the rib 45 to be positioned therein.

Therefore, the engagement between the reverse section 39 and the projection 49 can restrict the flat cable 9 to fall down between the ribs 45 and 47 and the roller 27f.

When the free motion spacer 7 is assembled to the side of the casing 13 in this state, a floating gap having a height of H is generated between the free motion spacer 7 and the casing 13. By a visual observation of this floating gap, an operator can find the erroneous assembly of the flat cable 9 easily.

Advantage of the Embodiment

The rotary connector device 1 according to the embodiment of the present invention comprises the body 3 which is supported to the vehicle body side and through which the steering shaft penetrates, the rotor 5 which is rotatably connected to the body 3 and through which the steering shaft penetrates, and rotatable in response to rotation of the steering wheel, the free motion spacer 7 including a group of rollers 27a, 27b, 27c, 27d, 27e, and 27f arranged circularly between the body 3 and the rotor 5 and the reverse guide section 31 in which a guide face is provided to be opposed to the roller 27a in the group of rollers 27a, 27b, 27c, 27d, 27e, and 27f in the circumferential direction to form the reverse insert section 33 and capable of turning with rotation of the rotor 5, and the flat cable 9 which is reversed by inserting the reverse section 39 into the reverse insert section 33 in the free motion spacer 7 and is wound around the outer and inner peripheral sides of the group of rollers 27a, 27b, 27c, 27d, 27e, and 27f, the rotary connector device further comprising the ribs 45 and 47 provided at the wall face in the opposing side of the guide face 41 to project from the wall face 43 toward the roller 27f adjacent to the wall face 43 in the circumferential direction of the reverse guide section 31, the projection 49 for the stopper provided in the rib 45, whereby when the reverse section 39 of the flat cable 9 is erroneously assembled between the wall face 43 and the roller 27f adjacent to the wall face 43, the reverse section 39 runs on the ribs 45 and 47 and the projection 49 can restrict the reverse section 39 to fall down from the ribs 45 and 47.

Therefore, when the free motion spacer 7 is assembled to the casing 13 at the time the erroneous assembly is generated, the floating gap H between the free motion spacer 7 and the casing 13 is generated by the flexible cable 9 which has run on the ribs 45 and 47, making it possible to easily find the erroneous assembly of the flexible cable 9. Thus the ribs 45 and 47 and the projection 49 can restrict the erroneous assembly of the flexible cable 9.

Further, since the ribs 45 and 47 are positioned between the wall face 43 in the opposing side of the guide face 41 of the reverse guide section 31 and the roller 27f, the axis length of each roller 27a, 27b, 27c, 27d, 27e, and 27f is not influenced. Therefore, it is possible to restrict or prevent an increase of a surface pressure which the flexible cable 9 receives from the rollers 27a, 27b, 27c, 27d, 27e, and 27f, due to maintaining the axis length of each roller 27a, 27b, 27c, 27d, 27e, and 27f.

In addition, the ribs 45 and 47 can increase strength and rigidity of the reverse guide section 31. Therefore, it is possible to thin a thickness of the reverse guide section 31 to achieve the light weight thereof.

Figure 5:
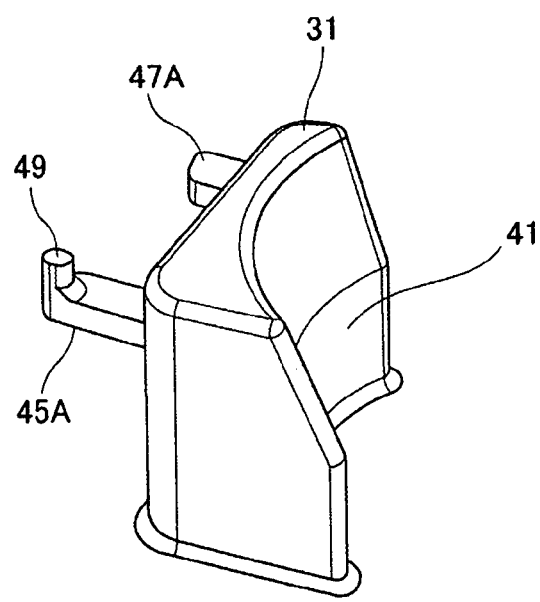
FIG. 5 is a partial enlarged perspective view showing a reverse guide section according to a second embodiment of the present invention.

FIG. 5 is a partial enlarged perspective view showing a reverse guide section in a second embodiment.

In the second embodiment in FIG. 5, the interposing sections are constructed not of the ribs but of projections 45A and 47A.

Figure 6:
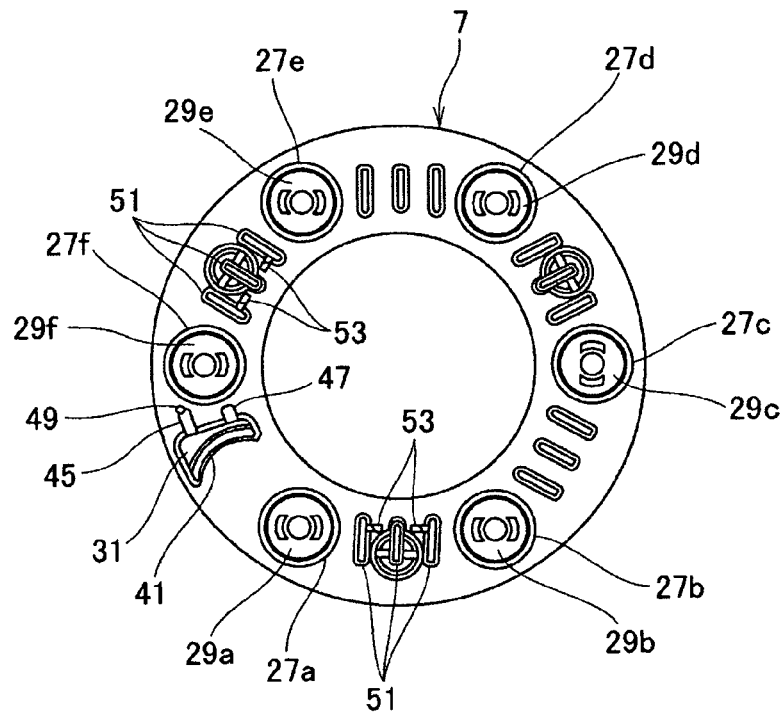
FIG. 6 is a partial enlarged plan view showing a free motion spacer according to a third embodiment of the present invention.
Figure 7:
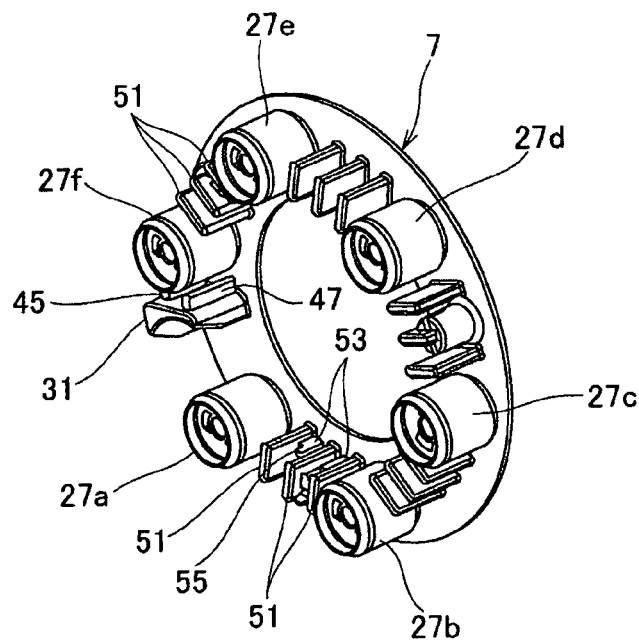
FIG. 7 is a partial enlarged perspective view showing the free motion spacer according to the third embodiment of the present invention.

FIGS. 6 and 7 show a third embodiment. FIG. 6 is a plan view showing a free motion spacer and FIG. 7 is a perspective view showing the free motion spacer.

The embodiment shown in FIGS. 6 and 7 is provided with small ribs 53 between ribs 51 formed between the roller 27*a* adjacent to the reverse guide section 31 and the roller 27*b* adjacent to the roller 27*a* and small ribs 53 between ribs 51 formed between the roller 27*f* adjacent to the reverse guide section 31 and the roller 27*e* adjacent to the roller 27*f*. The small rib 53 is projected with a projection 55 projecting toward a front end of the rib 51.

Therefore, an erroneous assembly of the flat cable 9 between the ribs 51 can be restricted by the small rib 53 and the projection 55 in the same way as the above embodiment.

Figure 8:
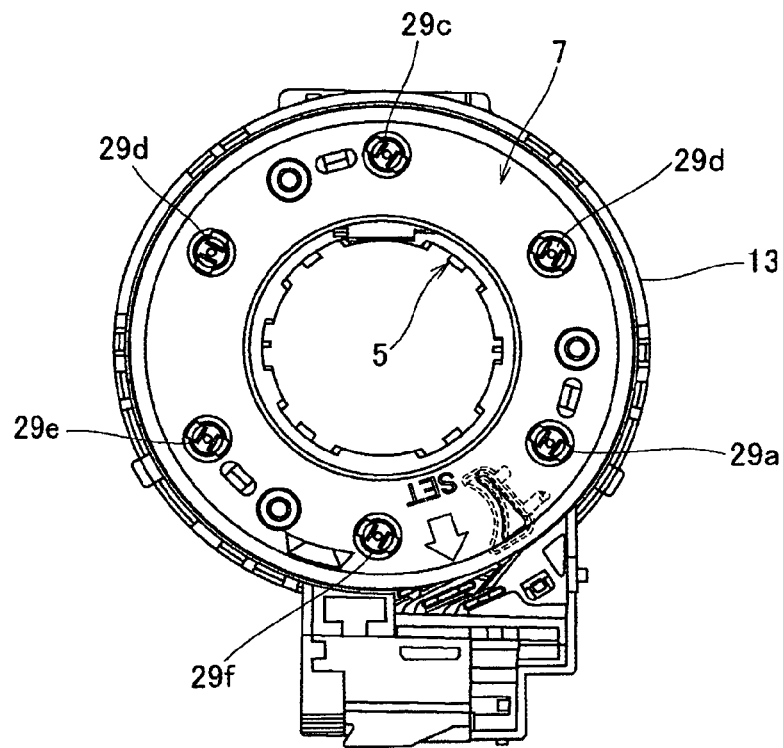
FIG. 8 is a plan view showing a state of combining a free motion spacer, a flat cable, and a rotor as viewed from the side of the free motion spacer according to a fourth embodiment of the present invention.
Figure 9:
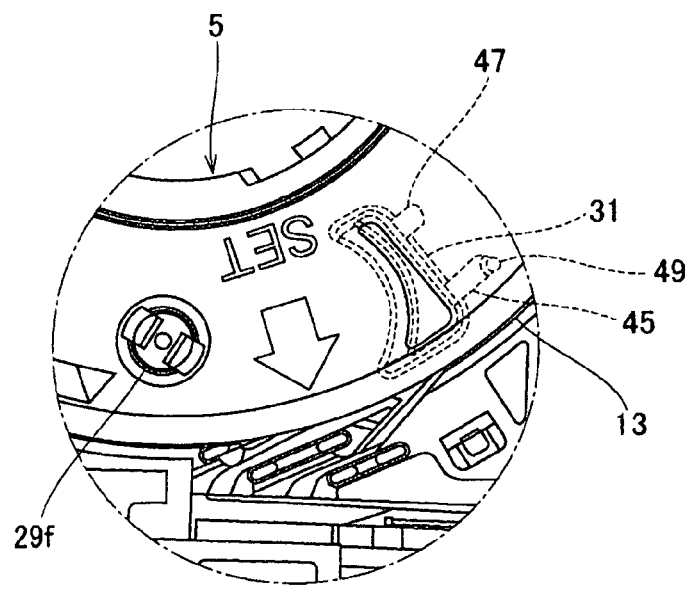
FIG. 9 is a partial enlarged plan view showing a state of combining the free motion spacer, the flat cable, and the rotor as viewed from the side of the free motion spacer according to the fourth embodiment of the present invention.

FIGS. 8 and 9 are a fourth embodiment. FIG. 8 is a plan view showing a state of combining a free motion spacer, a flat cable, and a rotor as viewed from the side of the free motion spacer, and FIG. 9 is a partial enlarged plan view showing a state of combining the free motion spacer, the flat cable, and the rotor as viewed from the side of the free motion spacer. It should be noted that an entire construction of the rotary connector device is referred to as FIG. 1.

In this embodiment, a letter of "SET" and an arrow mark are provided at the backside of the donut-shaped plate section 25 in the free motion spacer 7 in a position corresponding to a space between the reverse guide section 31 and the roller 27*a* adjacent to the reverse guide section 31. The position of the letter of "SET" and the position of the arrow mark correspond to a position of the reverse section 39 in the flat cable 9.

Therefore, in a case where the flat cable 9 is assembled to the rotor 5, the casing 13 is attached to the rotor 5, and further the free motion spacer 7 to which the respective rollers 27*a*, 27*b*, 27*c*, 27*d*, 27*e*, and 27*f* are attached is assembled to the casing 13, when the assembly to the casing 13 is made to align the letter of "SET" and the arrow mark with the reverse section 39 of the flat cable 9, a smooth assembly can be made without an erroneous assembly.

[Others]

The projection 49 may be provided in both of the ribs 45 and 47 or the ribs 45*a* and 47*a*, or may be provided in the ribs 47 and 47*a* only.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A rotary connector device comprising:
    a fixed-side member which is supported to a vehicle body side and through which a steering shaft penetrates;
    a rotary-side member which is rotatably connected to the fixed-side member and through which the steering shaft penetrates, and rotatable in response to rotation of a steering wheel;
    a free motion spacer including a group of spacer sections arranged circularly between the fixed-side member and the rotary-side member and a reverse guide section in which a guide face is provided to be opposed to any spacer section in the circumferential direction to form a reverse insert section and capable of turning with rotation of the rotary-side member; and
    a flexible cable which is reversed by inserting a reverse section into the reverse insert section in the free motion spacer and is wound around the outer and inner peripheral sides of the group of spacer sections, the rotary connector device further comprising:
    an interposing section provided at a wall face of the reverse guide section in the opposing side of the guide face in the circumferential direction of the reverse guide section to be positioned between the wall face and the spacer section adjacent to the wall face; and
    a projection for a stopper provided in the interposing section, wherein:
    when the reverse section of the flexible cable is erroneously assembled between the wall face and the spacer section adjacent to the wall face, the reverse section runs on the interposing section and the projection restricts the reverse section to fall down from the interposing section.

2. A rotary connector device according to claim 1, wherein:
    the interposing section includes a pair of interposing portion provided at a position of an inner diameter side and at a position of an outer diameter side in the diameter direction on the wall face to oppose with each other; and
    the projection is provided in at least one of the pair of the interposing portions.

* * * * *